(12) United States Patent
Moitra et al.

(10) Patent No.: US 7,647,232 B2
(45) Date of Patent: Jan. 12, 2010

(54) REAL-TIME TEAM COORDINATION SYSTEM FOR RECONNAISSANCE AND SURVEILLANCE MISSIONS

(75) Inventors: Abha Moitra, Westwood, MA (US); Robert M. Mattheyses, Schenectady, NY (US); Robert J. Szczerba, Endicott, NY (US); Louis J. Hoebel, Burnt Hills, NY (US); Virginia A. Didomizio, Latham, NY (US); Boris Yamrom, Bronx, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1745 days.

(21) Appl. No.: 10/079,630

(22) Filed: Feb. 21, 2002

(65) Prior Publication Data

US 2003/0158744 A1 Aug. 21, 2003

(51) Int. Cl.
*G06Q 10/00* (2006.01)
(52) U.S. Cl. .............................. 705/1; 342/70; 342/25 A
(58) Field of Classification Search ...................... 705/1; 342/70, 25 A
See application file for complete search history.

(56) References Cited

U.S. PATENT DOCUMENTS

| 4,323,880 | A | 4/1982 | Lucas |
| 4,814,711 | A | 3/1989 | Olsen et al. |
| 4,868,755 | A | 9/1989 | McNulty et al. |
| 4,984,168 | A | 1/1991 | Neukrichner et al. |
| 5,083,256 | A | 1/1992 | Trovato et al. |
| 5,187,667 | A | 2/1993 | Short |
| 5,204,817 | A | 4/1993 | Yoshida |
| 5,247,356 | A | 9/1993 | Ciampa |
| 5,268,698 | A | 12/1993 | Smith, Sr. et al. |
| 5,458,490 | A | 10/1995 | Cabana |
| 5,481,479 | A | 1/1996 | Wight et al. |
| 5,497,157 | A | 3/1996 | Gruener et al. |
| 5,629,626 | A | 5/1997 | Russell et al. |
| 5,631,640 | A | 5/1997 | Deis et al. |
| 5,636,123 | A | 6/1997 | Rich et al. |
| 5,638,282 | A | 6/1997 | Chazelle et al. |
| 5,646,844 | A | 7/1997 | Gudat et al. |
| 5,668,717 | A | 9/1997 | Spall |
| 5,689,475 | A * | 11/1997 | Chaumet-Lagrange ....... 367/88 |
| 5,712,788 | A | 1/1998 | Liaw et al. |
| 5,731,978 | A | 3/1998 | Tamai et al. |
| 5,751,576 | A | 5/1998 | Monson |
| 5,790,123 | A | 8/1998 | Wald et al. |
| 5,815,417 | A | 9/1998 | Orr et al. |

(Continued)

*Primary Examiner*—Janice A. Mooneyham
*Assistant Examiner*—Michael J Fisher
(74) *Attorney, Agent, or Firm*—Tarolli, Sundheim, Covell & Tummino LLP (57) ABSTRACT

A method routes a predefined number of entities (200) through a predetermined area for scanning the content of the predetermined area. The method comprises the steps of: partitioning the predetermined area into a first set of cells (100); grouping the first set of cells (100) into a number of corridors (201) equal to the number of entities (200); determining a starting cell for each entity (200) in each corridor (201); initiating a scan of cells of each of the corridors (201) from the starting cell of each of the entities (200) and determining the content of each of the scanned cells; and determining a total cost for each entity (200) to travel to each of the scanned cells scanned by each entity (200) and performing a scan from each of the scanned cells by each entity (200).

16 Claims, 5 Drawing Sheets

U.S. PATENT DOCUMENTS

| | | |
|---|---|---|
| 5,838,262 A | 11/1998 | Kershner et al. |
| 5,883,586 A | 3/1999 | Tran et al. |
| 5,884,223 A | 3/1999 | Tognazzini |
| 5,892,462 A | 4/1999 | Tran |
| 5,928,294 A | 7/1999 | Zelinkovsky |
| 5,999,881 A | 12/1999 | Law et al. |
| 6,038,509 A | 3/2000 | Poppen et al. |
| 6,047,234 A | 4/2000 | Cherveny et al. |
| 6,076,042 A | 6/2000 | Tognazzini |
| 6,085,147 A | 7/2000 | Myers |
| 6,092,009 A | 7/2000 | Glover |
| 6,122,572 A | 9/2000 | Yavnai |
| 6,128,574 A | 10/2000 | Diekhans |
| 6,134,500 A | 10/2000 | Tang et al. |
| 6,148,259 A | 11/2000 | Hagelauer |
| 6,167,331 A | 12/2000 | Matsumoto et al. |
| 6,169,981 B1 | 1/2001 | Werbos |
| 6,173,219 B1 | 1/2001 | Deker |
| 6,175,802 B1 | 1/2001 | Okude et al. |
| 6,175,804 B1 | 1/2001 | Szczerba |
| 6,182,007 B1 | 1/2001 | Szczerba |

* cited by examiner

Fig.4C

REAL-TIME TEAM COORDINATION SYSTEM FOR RECONNAISSANCE AND SURVEILLANCE MISSIONS

FIELD OF THE INVENTION

The present invention relates to a system for routing multiple sensors through a predefined area and, more particularly, to a system for scanning a target portion of the predefined area utilizing multiple sensors.

BACKGROUND OF THE INVENTION

Various operations are becoming increasingly dependent on intelligent systems to guide the planning and execution of critical mission tasks. Planning missions by hand, or by large, ground-based computer systems is rapidly becoming obsolete in a world in which rapid access to information is almost as important as physical capability. One of the critical planning tasks involves the real-time route and sensor planning for a variety of mission scenarios. The missions may be military or civil and take place on land, sea or in the air. Developing algorithms and architectures to solve these problems is a rapidly growing area of interest. Once a large enough portion of an area has been scanned by one or more sensor equipped entities, other entities may safely enter the area and perform their various functions.

One of the main components of such planning operations involves the development of accurate and efficient route and sensor planning algorithms for a team comprising various team members. Most of the current research in this area focuses on the routing of a single entity between two stationary locations. In the real-world, situations are dynamic and the planning and replanning of such operations is generally considered the most critical part of a mission. If mission doctrine permits communication between the team members, then one approach is to do planning at a single location using intelligent software agents to achieve appropriate coordination.

Such planning operations include, but are certainly not limited to, reconnaissance and surveillance operations, coordinated attack patterns, coordinated team progression, traveling and bounding overmatch, and target handoff. These operations are needed for a variety of operational platforms including air, naval, ground, and various tactical combinations of all three.

Finding solutions to these team coordination problems is very difficult and can determine the difference between success and failure of the mission. It is unlikely that there will be expedient solutions for this class of problems. Thus, heuristic approaches are used to generate efficient solutions in real-time that are as good or better than a human could generate. Only limited research has been conducted for solving these types of problems. Not just limited to military and civil applications, team planning operations may be critical for commercial autonomous robotics as well as outer space related applications, commercial avionics, and intelligent transportation systems.

SUMMARY OF THE INVENTION

In accordance with one aspect of the present invention, a method routes a predefined number of entities through a predetermined area for scanning the content of the predetermined area. The method comprises the steps of: partitioning the predetermined area into a first set of cells; grouping the first set of cells into a number of corridors equal to the number of entities; determining a starting cell for each entity in a corresponding corridor; initiating a scan of a number of cells from the starting cell of each of the entities and determining the content of each of the scanned cells; and determining a total cost for each entity to travel to each of the scanned cells and to perform a scan from each of the cells scanned by each entity.

In accordance with another aspect of the present invention, a system performs multiple scans of a target portion of a predefined search area. The system includes a plurality of sensors for scanning a first part of the predefined search area from a plurality of starting points and a plurality of devices for analyzing output from each sensor and determining a destination point within the predefined search area for each sensor. Each sensor is assigned a corresponding device. The plurality of sensors each scan a second part of the predefined search area from the destination points. The first part and the second part together comprise a part of the predefined search area at least as large as the target portion of the predefined search area.

In accordance with still another aspect of the present invention, a computer program product determines a route for each of a plurality of entities through a predetermined search area and analyzes the content of the predetermined search area. The product includes the following procedures: a first procedure partitions the predetermined search area into cells; a second procedure groups the cells into corridors; a third procedure determines a starting cell for each entity, each starting cell being located in a cell in a corresponding corridor; a fourth procedure initiates a scan of a number of cells from each starting cell and determines the content of each of the scanned cells; and a fifth procedure determines a total cost for each entity to travel to each of the cells scanned in its corresponding corridor and for each entity to perform a scan from each of the cells scanned in its corresponding corridor.

In accordance with yet another aspect of the present invention, a computer program product analyzes the content of a predetermined area. The computer program product includes a computer readable medium and a computer program stored by the medium. The computer program includes: a first instruction for partitioning the predetermined area into cells and grouping the cells into corridors; a second instruction for determining a starting cell for each of a plurality of entities in its corresponding corridor; a third instruction for initiating a scan of a number of cells from each starting cell and determining the content of each of the scanned cells; and a fourth instruction for determining a total cost for each entity to travel to each of the cells scanned by a corresponding entity and for performing a scan from each of the cells scanned by the corresponding entity.

BRIEF DESCRIPTION OF THE DRAWINGS

The foregoing and other advantages of the present invention will become more readily apparent from the following description of an example embodiment of the present invention as taken in conjunction with the accompanying drawings, which are a part hereof, in which.

DESCRIPTION OF AN EXAMPLE EMBODIMENT

In accordance with an example embodiment of the present invention, before an area may be entered by team members, the status (i.e., safety) of the area may be determined by scanning the area. The scanning may be achieved by the routing of multiple sensors, and their associated entities, through the area to be scanned. Some examples of the entities may be cars, trucks, boats, airplanes, other appropriate vehicles or even people. As should be evident, the topography of the area should be considered when choosing the type of entity for a particular area. Route and sensor planning for reconnaissance and surveillance missions is an extremely complex problem.

To simplify the problem, multiple route and multiple sensor planning is typically done as follows: (1) divide the area to be scanned (each team member is assigned a part of the area under consideration); (2) generate paths (a route is planned independently for each team member or entity); and (3) assign scan points—sensor scans are opportunistically inserted for each team member irrespective of the other team members (i.e., greedy routing) until a target coverage objective is achieved.

A generated solution typically must meet the stated area coverage objectives (i.e., a minimal percentage of the area must be scanned and thereby determined safe). Furthermore, the generated solution should meet this objective with a low overall associated cost (related to the amount of threat exposure when performing a particular mission), while satisfying a variety of efficiency, doctrine, and aesthetic requirements, as follows: cost of the generated solution, the exposure to threat locations encountered when following the generated route and sensor plan; efficiency, time to generate the route and sensor plan (typical efficiency requirements rule out an exhaustive search of the area to be scanned, especially when considering real-time computations); doctrine, safety considerations—for example, sensor scans may only be performed from safe points (sensor locations which have been previously scanned and/or the entities and are known to be free of threats; the path between scan points should also be safe); and aesthetics, the generated plan should avoid loops, excessive backtracking, and unnecessary zigzag segments.

In this typical approach, it is difficult to directly factor in efficiency, doctrine and aesthetic considerations. While some post-processing is possible, the only way to achieve the coverage objective with low cost and high efficiency, and also doctrine and aesthetic considerations, is to intelligently integrate route and sensor planning and coordination between team members.

Figure 1:
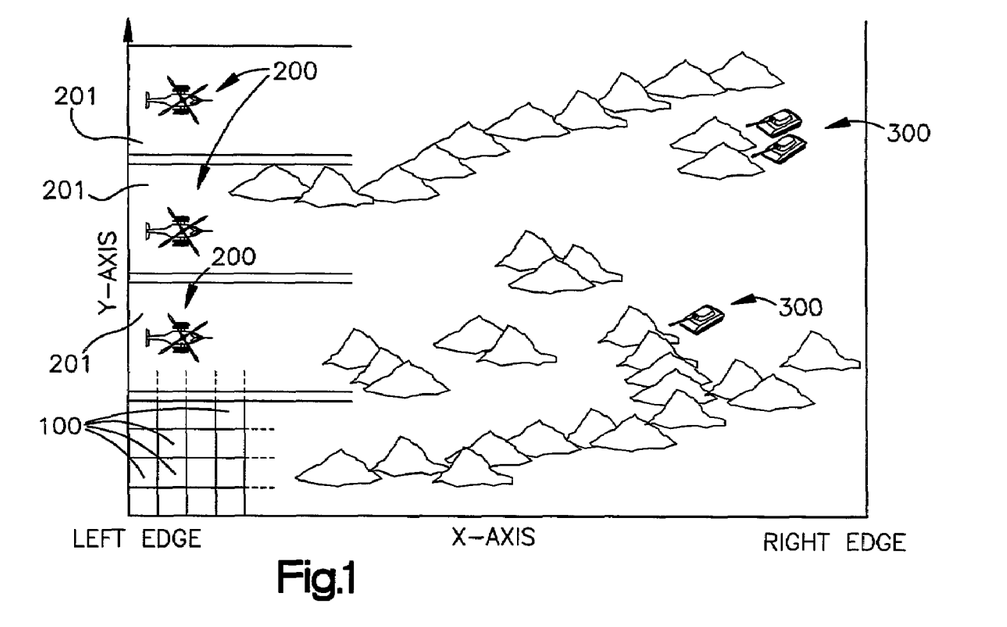
FIG. 1 is a schematic plan view of a search area for use with the present invention.

In accordance with the present invention, integrated route planning and sensor planning across a coordinated team of entities for reconnaissance and surveillance missions may be termed the TeamPlanning algorithm, or developing a Team-Plan. A schematic plan view of TeamPlanning is illustrated in FIG. 1. Any solution to the TeamPlanning problem meeting the stated objectives must be evaluated by the following two criteria: the time required to generate a solution and the quality of the solution generated. The problem is complicated in two ways: (1) by the intrinsic computational complexity of the underlying optimization problem; and (2) by details introduced by the real-world application domain.

A mission planner, such as a person or a computer, must balance competing objectives with relative degrees of importance that can differ from one problem instance to the next (i.e., different data sets, etc.). In addition, not all of the objectives lend themselves to quantification. For example, as described above, the paths of each team member should not have too many zigzag segments. Thus, heuristic approaches are suggested to solve the TeamPlanning problem. The mission planner may be located at any communication linked location. In accordance with an example embodiment of the present invention, the general mission scenario and the definitions needed for specifying one TeamPlanning problem and its solution are described below.

As viewed in FIG. 1, the geographic area to be searched may be partitioned into a cell grid 100. The cell grid 100 may be modeled by an algorithm that is operated by a sufficiently equipped computer. The cells of the grid 100 are typically non-overlapping and square regions covering the entire area to be searched. Two attributes, Elevation and MapCost, characterize each cell. Elevation has the obvious definition and is treated as constant over the area covered by each cell (generally the average elevation value of the indicated cell). Map-Cost represents the danger or cost associated with visiting the cell, by traveling through the cell and scanning from the cell. MapCosts are non-negative real numbers. Higher values of MapCost indicate areas of increased danger or threat of danger. An infinite MapCost value represents a forbidden region (i.e., a lake that is not traversable by a land search entity). MapCost depends on mission type, search entity type, terrain of the grid 100, and other features. For this example, MapCost is predetermined as input data.

Each search entity 200 is characterized by its speed of travel and a fixed scan altitude above ground level (scan AGL), from which scan operations are performed. The scan AGL for each entity 200 may be assumed to be constant throughout a mission. When a search entity 200 is a helicopter (FIG. 1), this abstraction does not restrict the height at which the helicopter travels, but may instead conform to the practice of "popping up" to do a scan for enemy entities 300 or other dangers in the grid 100 and then returning to a predetermined mission altitude. Speed of traversal is also typically fixed for the entities 200.

Figure 2:
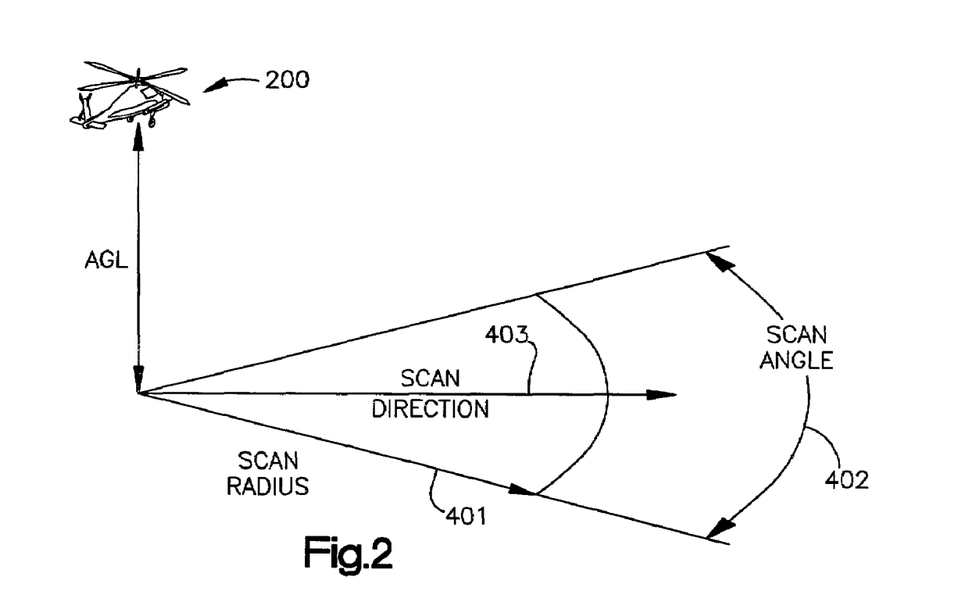
FIG. 2 is a schematic perspective view of a scan operation for use with the present invention.

Each entity 200 carries a sensing device, or sensor, which is used to do the "looking", or scanning. Each sensor may use infrared, radar, ultrasonic, etc. sensing technology. The sensor is typically characterized by a scan radius 401 (the distance limit of a scan operation), scan arc, or scan angle 402 (the footprint of the scan operation), scan direction 403 (the center of the scan angle at the time a scan is executed), and scan time. Scan time is the time required to perform a single scan operation. Each sensor's capabilities are typically assumed to be constant for the duration of a mission. A schematic of a typical scan operation is illustrated in FIG. 2.

The mission objective is typically defined as Target Coverage, the percentage of the region that must be scanned during the mission. Values of Target Coverage usually range from 60% to 80%. In this example, the given mission area to be traversed starts at a left border and proceeds to a right border, as illustrated in the plan view of FIG. 1.

The TeamPlan consists of sequences of scan points 501 for each entity 200. A scan point 501 corresponds to the center point of a particular subgrid (5 by 5 in FIG. 3). Each scan point 501 is identified by its location (grid point), scan AGL, and scan direction. A cell is considered scanned if it is less than the scan radius distance from the scan point and is visible from the AGL above the scan point (i.e., within range of the sensor of and visible to a sensor equipped entity 200). The order of the scan points 501 in a sequence defines a traversal of the region by a scanning entity 200. It is assumed that each entity 200 travels in a straight-line path between successive scan points, though any route planning algorithm may be used.

Doctrine may specify additional objectives and constraints on the TeamPlan. Personnel safety and entity safety may be critical issues, especially in applications that involve travel through extremely dangerous or hostile environments. Thus, doctrine may specify that scans can only be performed from safe cells. As viewed in FIG. 3, a cell 501 may be considered safe if it has been previously scanned and all its eight neighbors 502 have been scanned. This adjacency condition may be relaxed for cells that are on ridges, as described below.

Figure 3:
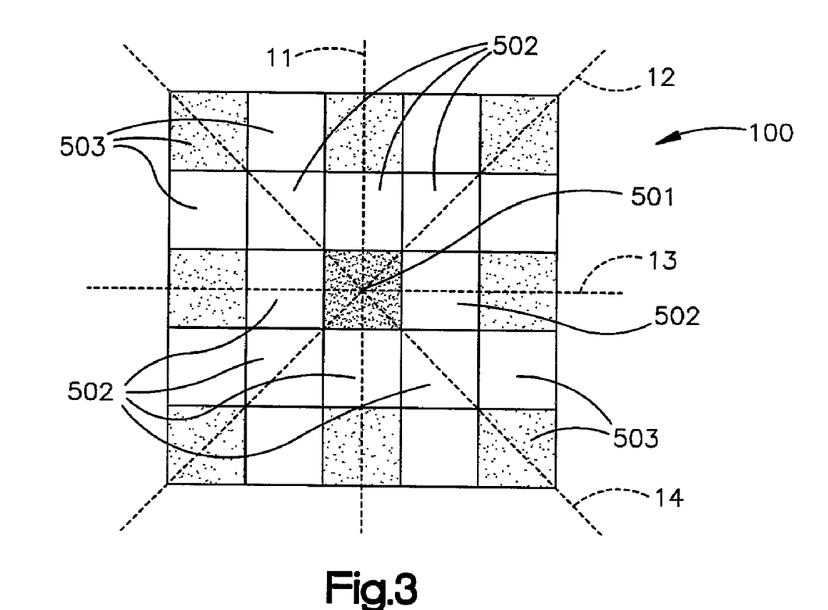
FIG. 3 is a schematic plan view of a sample grid of cells for use with the present invention.

A path (such as a straight line between 501 and 503) between two scan points is considered safe if all the cells that the path intersects have been previously scanned. This constraint may be treated as soft (i.e., optional) depending upon the degree of criticality as determined by a mission planner at run time. Treating it as a hard constraint could lead to blocked missions in certain situations. In addition, there are aesthetic requirements, such as avoiding loops (self-intersecting paths), excessive backtracking, and unnecessary zigzag segments, which ideally should be considered in any final solution.

Coordination between team members (i.e., entities 200) may also present some constraints. It is typically undesirable for two entities 200 to be located too closely at any given time, since a collision or a single enemy shot could eliminate both entities. This is a difficult constraint to follow because of the complicated and dynamic interactions between the entities 200. One option is to quantify this constraint by defining a minimal separation between the search paths of the entities 200. Since travel times and scan times are predefined when constructing the TeamPlan and are usually approximate, this approach is typically suitable.

TeamPlanning is a very dynamic process. TeamPlans often need to be planned and re-planned quickly as situations change (i.e., movement of enemy entities 300 during the mission). The speed with which TeamPlans can be generated is another critical factor of any solution. Replanning, which may take place during the mission execution itself, must be even faster.

As described above, the TeamPlanning algorithm may be a "greedy" algorithm where each entity 200 selects the best next scan point from a set of potential next scan points in the area assigned to that entity without "look ahead". For each entity 200, the set of potential, or candidate, next scan points consist of all points in its corridor that have been previously scanned which are interior to (not on the border of) the scanned area plus all ridge points that have been previously scanned. From this set, candidate next scan points that do not meet the pro-rated target coverage are discarded, as described below. For the remaining candidate next scan points, their value is determined by a tradeoff between cost and benefit. In its simplest form, the cost is the cost for an entity 200 to travel to the next scan point (from the current scan point) and the cost for the entity to perform the scan at the next scan point. The benefit is based on the number of allocated new cells able to be scanned from the next scan point by the entity.

Since the algorithm does not use "look ahead", and actual backtracking (moving in the negative x direction) is undesirable, it is necessary to assure, during the scan, that the scanned region covers the area sufficiently densely. Target Coverage (as defined above) is a simple concept at the completion of a mission. It is simply: # of cells scanned/# cells in the area. Likewise, Local Target Coverage (for an individual scan by an individual entity 200) can be defined for any area A as: # scanned cells in A/# cells in A.

"A" must be properly defined so that the TeamPlan is kept on track for meeting the Target Coverage by the time the right border is encountered (FIG. 1) by one or more entities 200. Two definitions of A may yield two different approximations of Local Target Coverage. These are: (1) base Local Target Coverage on the x-coordinate of the scan point; or (2) base Local Target Coverage on the x-coordinate of rightmost cell scanned. The first definition above typically performs better when the Target Coverage is high (i.e., 80%).

The tradeoff between cost and benefit is typically a complex analysis. The cost component depends on the MapCost values assigned to grid cells for which there is no a priori limit. Similarly, the benefit component depends on the number of allocated new cells scanned for each entity 200, which in turn depends on the scan radius, scan angle, scan AGL, and scan direction. To limit this complexity, the following control parameters may be defined.

PathWeight is a parameter by which the MapCost of each grid cell on the path is algebraically transformed (i.e. multiplied) to obtain the cost of traveling to the next scan point. Typically this parameter is 1, in which case the internal algorithmic path cost matches the external path cost of the TeamPlan.

ScanWeight is a parameter by which the MapCost of the next scan point is algebraically transformed (i.e. multiplied) to obtain the cost of performing the scan. This parameter reflects the time needed for performing the scan so as to quantify the exposure cost to an entity 200. If the scan angle is 30° and the time required to perform a 30° scan is twice the time needed to traverse a grid 100, then this parameter may be set at 2.

RepeatWeight is a parameter by which the number of rescanned cells is algebraically transformed (i.e. multiplied) to obtain the cost of repeated scans. All other parameters being equal, the number of cells that are being rescanned should be as little as possible. This parameter may be 1.

UnsafePathWeight is a parameter by which the number of unscanned cells in the path is algebraically transformed (i.e. multiplied) to obtain the cost of traversing an unscanned area in order to reach the next scan point. This factor penalizes the traversing of an unscanned area (which is generally undesirable).

NewCellWeight is a parameter by which the number of allocated new cells scanned is algebraically transformed (i.e. multiplied) to obtain the cost of a scan from the next scan point. The number of allocated new cells scanned is considered a benefit (hence the effect of this parameter is negative). This parameter may be extremely critical since it may potentially offset the cost, which has no a priori limit, as described above. A candidate next scan point is discarded if no allocated new cells can be scanned from it. This discarding not only ensures that progress is made, but also allows the algorithm to terminate when no further progress can be made (i.e., when algorithm definitions or parameter settings are unreasonable or unworkable).

When the Target Coverage for the TeamPlan has been achieved, the algorithm may choose to have all entities 200 move out of the area (to the right edge). This aspect may be tailored to suit specific mission needs.

Selection of scan points is generally restricted to safe cells and scanned ridge cells (as mentioned earlier, a safe cell is one that, along with its eight neighbors, has been previously scanned). To comply with this restriction, at the start of the algorithm the leftmost edge of the search region (3 cells wide) is marked as already scanned. In a real mission this would correspond to a safe "staging-area", where the entities 200 can scan into the desired search area to determine a safe point of entry and next scan points. This allows a non-null initial set of candidate next scan points. This leftmost strip of already scanned cells, or safe frontier, does not contribute towards Target Coverage even if some of these cells are scanned later. While this may undercount the number of cells scanned, it allows for a uniform and simple counting of scanned cells in the algorithm.

A single scan operation may determine safe cells, safe front cells, and boundary cells. The number of each of these types of cells determined in a single scan operation is dependent upon the ability and utilization of sensors (i.e., scan radius 401, scan direction 403, scan angle 402, etc.).

Initiating the algorithm with the safe frontier also implies that the calculation of the Target Coverage in the previous section must be adjusted accordingly. Ridges often limit scanning, thus they are likely to be on the boundary of the set of scanned cells. This would normally make them ineligible as cells from which to perform scans. This situation could lead to blocking, leaving a scanning entity with no safely reachable safe next scan points. To avoid this situation and to include behavior from real missions, ridge cells may be included in the set of candidate next scan points even if they are on the boundary. Thus, the algorithm may select a cell as a next scan point for an entity 200 from the boundary of the scanned cells, as long as that cell is a ridge cell.

The determination of ridge cells for the entire area is done as a preprocessing step by the algorithm. A simple computation is used to identify ridge cells. A cell is on a ridge if along some direction the cells on both sides are lower. To translate this definition to the grid 100, four directions 11, 12, 13, 14 may be used, as indicated in FIG. 3. If the cells along a single line 11, 12, 13, or 14 on both sides of the center cell 501 have a smaller Elevation than the center cell by more than a threshold amount, the center cell is labeled as a ridge. Typically the threshold amount used is the scan AGL. A 5 by 5 grid (FIG. 3) typically yields better results than a 3 by 3 grid, while not significantly increasing the computation time.

When selecting the next scan points for multiple entities 200, the benefit of scanning new cells scanned by other entities should be credited only once. A simple allocation assigns the benefit to the scan point that is identified earlier. This must be considered, however, when selecting a next scan point for the other, non-benefited entity 200.

For each entity 200 of the TeamPlanning algorithm, the time for traversing a cell and the time for performing the scan are predetermined. At each point in time (other than prior to initialization), the next scan point for each entity 200 and when that scan will be performed are stored. The algorithm repeatedly selects the next entity 200 for consideration to be the one with the earliest next scan point. The scan for that entity 200 is conducted and a new next scan point for that entity is determined. The algorithm selects the new next scan point from the subset of previously scanned points. However, the benefit of the next scan point 703 is calculated based on the previously scanned cells 701, as well as the next scan points 702 for all the other entities 200, as schematically shown in FIG. 6. This ensures that the benefit of the selected scan point will actually accrue.

As described above, a certain amount of spatial separation between paths of the entities 200 typically should be maintained. Depending on the defined grid 100 (i.e., the terrain, the size of the grid, number of entities 200, etc.), spatial separation may be difficult achieve. In accordance with one aspect of the example embodiment, a preferred corridor 201 (FIG. 1) may be assigned to each entity 200. Each corridor 201 may be uniform in size and vertically separated by a specified parameter, CorridorMargin. The next scan point that is outside each entity's corridor may be penalized by an amount dependent on how far outside the entity's corridor the next scan point lies. A parameter CorridorViolWeight determines the magnitude of this penalty. This parameter is used for algebraically transforming the penalty for the next scan point that is outside the particular corridor.

The flexibility of the TeamPlanning algorithm allows the introduction of the following two additional control parameters. CircularSearchBound quantifies how far backward the entity 200 can travel to the next scan point from the current scan point, typically specified as a fraction of scan radius 401. This effectively limits the amount of backtracking permitted for travel to the next scan point. BackwardSearchBound quantifies how far back the entity 200 can travel from the outermost point that the entity has scanned, typically specified in number of cells. This effectively provides a sliding window from which the next scan point is selected. It also ensures that the maximum number of candidate next scan points is bounded no matter how long the search area becomes. These two control parameters limit the amount of backtracking permitted and hence improve both the algorithm efficiency as well as the quality of the TeamPlan generated.

A major component of the algorithm running time consists of the continual running of a line of sight sub-routine to determine the coverage that a candidate next scan point might provide if selected as the next scan point. Any scanned cell (not on the boundary) and scanned ridge cell may comprise a set of candidate next scan points. This set may be very large. Limiting the size to a more practical/workable subset is critical to the time performance of the algorithm. The subset selection process includes the following: (1) limiting candidate next scan points to be just inside the boundary already scanned plus the scanned ridge cells on the boundary; (2) limiting backtracking via the parameter CircularSearchBound; (3) using a "fixed size" sliding window from which candidate next scan points can be selected via the parameter BackwardSearchBound; and (4) further subsampling candidate next scan points since neighboring points typically have similar cost and benefit. A parameter, SparsenessFactor, may be used to avoid needlessly considering candidate next scan points that are close together. A deterministic technique (for repeatability of testing) or a random sampling may be used.

All these techniques contribute to achieving a flexible, time efficient algorithm, able to generate high quality TeamPlans for a wide variety of missions. Below is an example of one possible algorithm:

Algorithm: TeamPlanning

Input: Number of Searcher Entities; Search Area, specified as a grid of cells with MapCost and Elevation.

Goal: Target Coverage, percentage area to be scanned.

Output: Scan List, an ordered list of <p, d> for each Searcher Entity s where p is a scan point and d is a scan direction. Percentage, percentage area scanned.

DEFINITIONS

List(s): an ordered list of scans performed by Searcher Entity s until CurrTime
    <NextScanPoint(s), NextScanDir(s)>= the next scan for s.
    NextScanTime(s): time at which the next scan will be performed by Searcher Entity s.
    RightMostScanX(s): largest x coordinate of all scans in List(s).

Scanned(c): True iff cell c has been scanned by a Searcher Entity by CurrTime.

Safe(c): True iff Scanned (c) and all 8 neighbors of c have been scanned.

To_Be_Scanned(c): True iff Scanned(c) or c will be scanned by a Searcher Entity s by NextScanTime(s).

Boundary(c): True iff Scanned(c) and c is adjacent an unscanned cell.

SafeFront (c): True iff Safe(c) and c is adjacent a boundary cell.

Ridge(c): True iff, along some direction, the cells on both sides of c have lower AGL than AGL of c.

1. Initialization: Establish a safe starting edge for Searcher Entities by marking all cells in the 3 leftmost columns as Scanned and To_Be_Scanned. Set CurrTime to be 0. Horizontally partition Search Area into as many equal sized strips (corridors) as the Number of Searcher Entities, where the strips are separated by CorridorMargin. Set each Searcher Entity's current position to be a middle cell in the $2^{nd}$ leftmost column in its corridor.
2. For each Searcher Entity s, determine a next scan and time when the next scan will be performed.
    A. Identify candidates for next scan point:
        a. Define Candidate Scan Point for Searcher Entity s, CSP(s)={p|SafeFront(p) OR (Boundary(p) AND Ridge (p))}.
        b. if SparsenessFactor=q, then retain every qth element in CSP(s).
        c. prune CSP(s) further by discarding all scan points that are not within CircularSearchBound*ScanRadius of current position of s.
        d. prune CSP(s) by discarding all scan points that are not within BackwardSearchBound of RightMostScanX (s).
        e. if CSP(s) is an empty set, then the TeamPlanning algorithm terminates as no candidates for scan points remain for s.
    B. Define scan candidate set S(s)={<p,d>|p in CSP(s) and d in allowed scan directions}.
    C. For each scan candidate <p,d> in S(s), determine Cost (<p,d>), as follows:
        a. Define A to be total number of cells scanned, including from scan <p,d>, but not on left edge.
        b. Define B to be (x coordinate of p)*number of vertical cells in Search Area.
        c. Define Count to be the number of newly scanned cells from scan <p,d> that are not To_Be_Scanned.
        d. Cost (<p,d>)=
            ScanWeight*MapCost (p)
            +PathWeight*sum of MapCost of cells on straight line path from Searcher Entity's current position to p
            +UnsafePathWeight*number of unscanned cells in straight line path from Searcher Entity's current position to p
            +RepeatWeight*number of repeat cells scanned due to scan <p,d>
            +NewCellWeight*Count
            +CorridorViolWeight*(how far y coordinate is out of corridor of s).
        e. If A/B<TargetCoverage or Count=0, then set Cost(<p, d>)=infinity.
    D. Select scan <p, d> from S(s) with minimum Cost. All cells that will be visible from this scan, but are not yet To_Be_Scanned, set To_Be_Scanned to be true. Update NextScanTime(s) to be when this scan will be completed.
3. Across all Searcher Entities, pick Searcher Entity s with the earliest NextScanTime(s).
    A. Perform the scan previously selected for s by updating Searcher Entity's current position, RightMostScanX. Set Scanned to be true for all cells visible via this scan. Append the scan to List(s). Set CurrTime to be NextScanTime(s).
    B. Determine the next scan point for Searcher Entity s via step 2.
4. Repeat step 3 if percentage area scanned is less than the Target Coverage to be scanned.

The TeamPlanning algorithm has been conducted on various subsets of a large area. The entire data set was for a 100 km×100 km area. Each grid cell was 100 m×100 m. Each scan was performed on a rectangular subgrid, typically 300 cells by 100 cells.

The TeamPlanning system is an accurate, time efficient, and robust algorithm for real-time route and sensor planning applications coordinated across a team of searcher entities. The ability to handle a wide range of target coverage goals during the planning process makes the algorithm valuable for a wide range of reconnaissance and surveillance applications. The uniqueness of the system is the ability to integrally adhere to mission doctrine and allow very fine control over the tradeoffs between cost, benefit, efficiency, and aesthetics in generating route and sensor plans. The algorithm may be applied to a number of other domains by simply varying the parameters used to compute the cost values in the map.

Figure 4A:
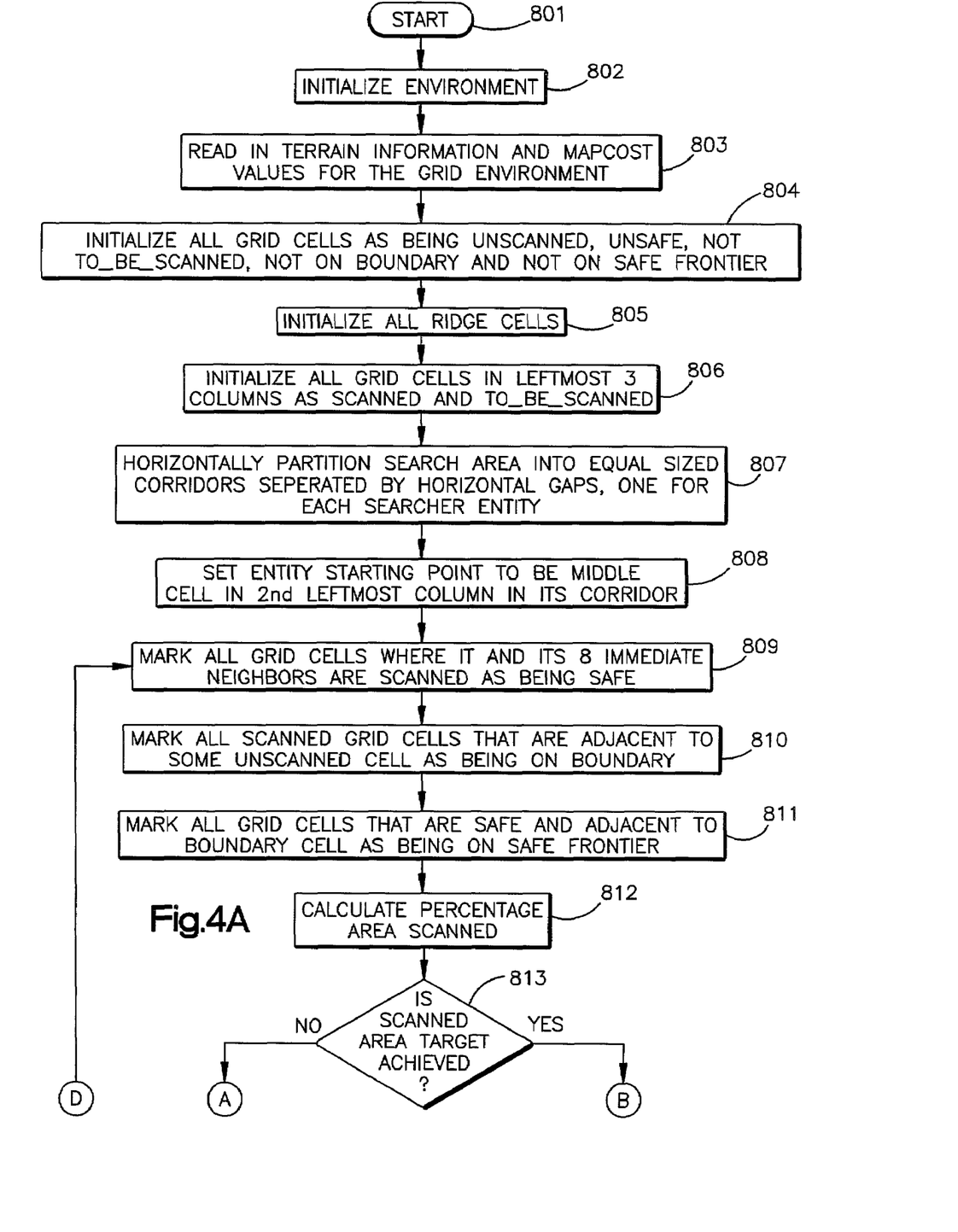
FIGS. 4A, 4B, and 4C are a schematic block diagram of one example algorithm for use with the present invention.
Figure 4B:
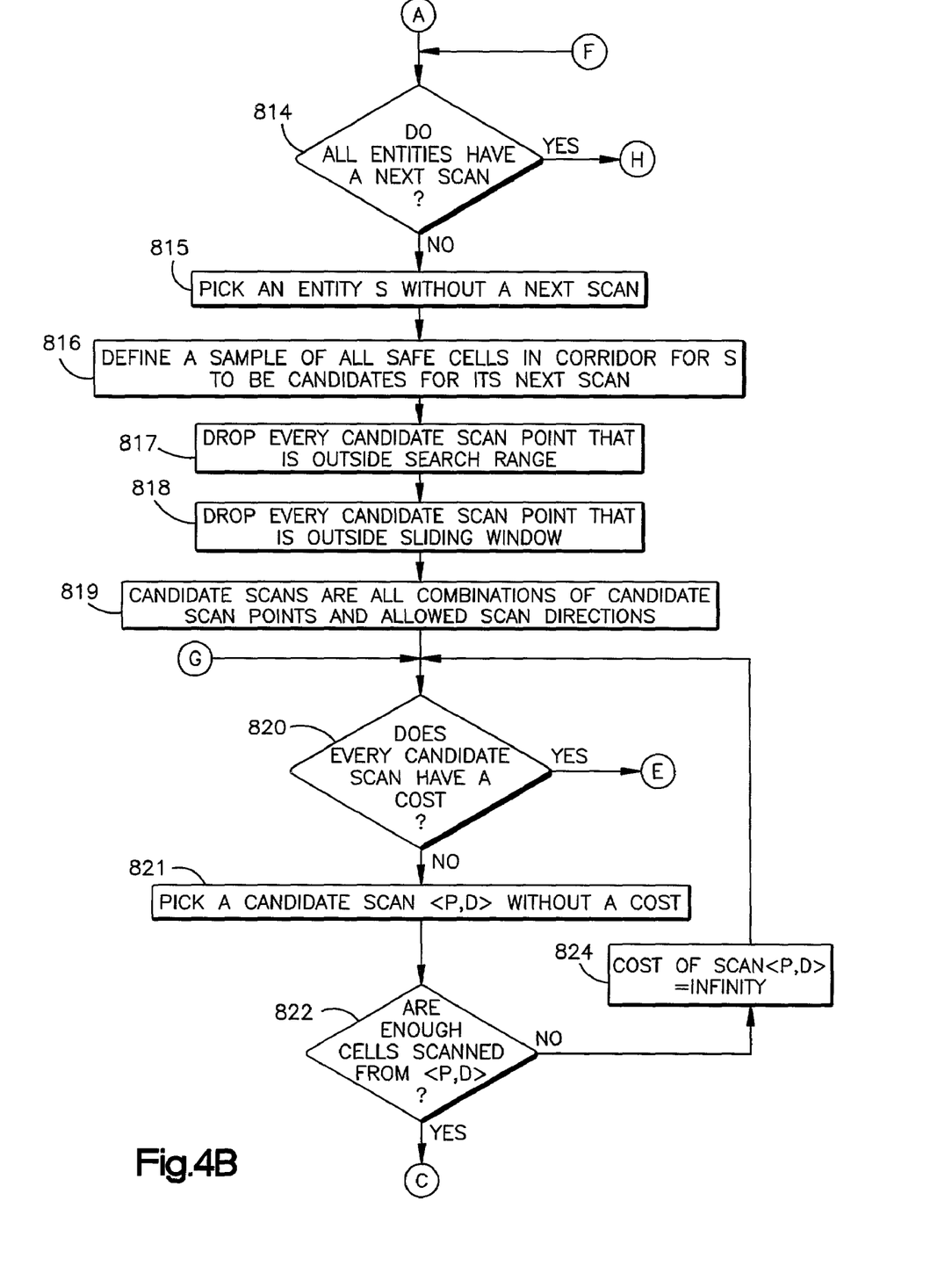
Figure 4C:
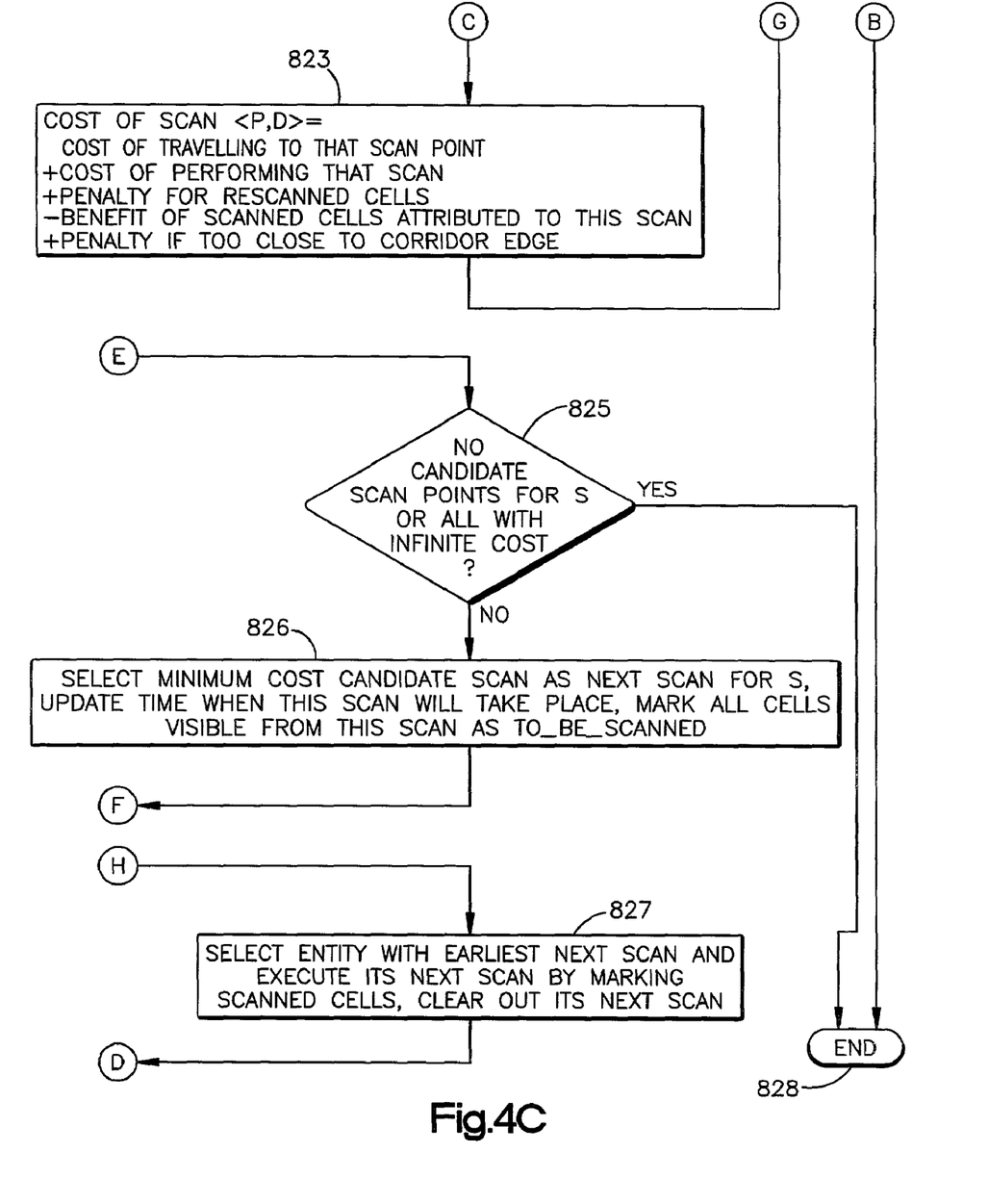
Figure 5:
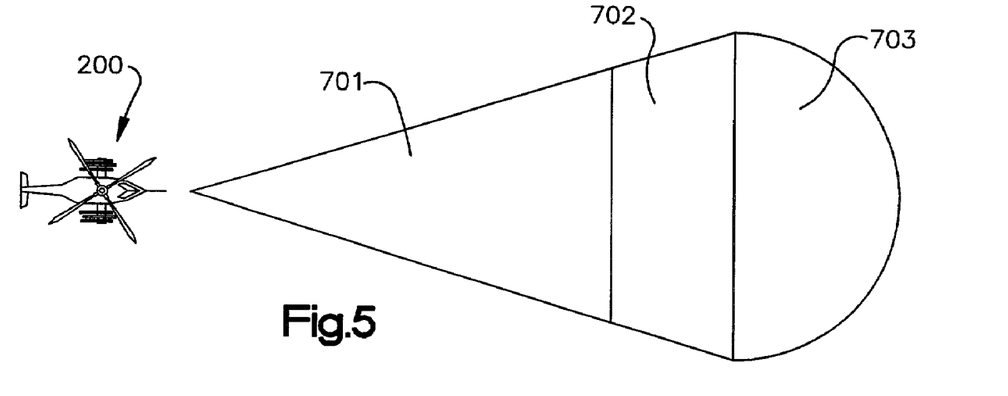
FIG. 5 is schematic plan view of still another scan operation for use with the present invention.

FIGS. 4A, 4B, and 4C are a flow diagram illustrating the manner in which a computer may be programmed to perform various functions of the algorithm described herein. Step 801 starts the algorithm. Following step 801, the algorithm advances to step 802. In step 802, the computer initializes the environment in which the algorithm will operate, such as initializing a particular software program and reading the geography of the cell grid 100. Following step 802, the algorithm advances to step 803. In step 803, the computer reads the predetermined terrain information (i.e., average elevation of each cell) and MapCost values of the cell grid 100. Following step 803, the algorithm advances to step 804. In step 804, the computer initializes all grid cells as unscanned, unsafe, not To_Be_Scanned scanned, not on a boundary, and not on a safe frontier. Following step 804, the algorithm advances to step 805. In step 805, the computer determines and initializes ridge cells of the cell grid 100. Following step 805, the algorithm advances to step 806. In step 806, the computer initially marks grid cells in the leftmost (in FIG. 1) three columns as scanned and to be scanned. These cells may be To_Be_Scanned by setting a flag for each cell in the three columns.

Following step 806, the algorithm advances to step 807. In step 807, the algorithm horizontally (in FIG. 1) partitions the cell grid 100 into equal sized corridors separated by horizontal gaps, one for each searcher entity 200 (alternatively, the corridors may vary in size for searcher entities having sensors with varying capabilities). Following step 807, the algorithm advances to step 808. In step 808, the computer sets the starting point (i.e., starting cell 501) of each entity 200 to be the vertically (in FIG. 1) middle cell in the second column from the left in that entity's corridor 201. Following step 808, the algorithm advances to step 809. In step 809, every grid cell (i.e., cell 502), where that grid cell and the eight immediate neighbors of that grid cell are scanned (including cells scanned for the first time), are marked by the computer as being safe. Following step 809, the algorithm advances to step 810. In step 810, the computer marks all scanned grid cells that are adjacent an unscanned cell as being boundary cells.

Following step 810, the algorithm advances to step 811. In step 811, the computer marks all grid cells that are safe and adjacent a boundary cell as being on a safe frontier. Following step 811, the algorithm advances to step 812. In step 812, the computer calculates and stores the value of the percentage area scanned. Following step 812, the algorithm advances to step 813. In step 813 the computer compares the percentage area scanned to a predetermined target coverage. If the percentage area scanned is greater than or equal to the predetermined target coverage, the computer ends the algorithm at step 828. If the percentage area scanned is less than the predetermined target coverage, the computer continues the algorithm at step 814.

In step 814, the computer determines whether all the search entities have a next scan. If all the search entities do have a scan, the computer continues the algorithm at step 827. If any of the search entities do not have a scan, the computer continues the algorithm at step 815. In step 815, the computer picks an entity without a next scan. Following step 815, the algorithm advances to step 816. In step 816, the computer defines a sample (i.e., as determined by the SparsenessFactor) of all safe cells in its corridor to be candidates for the next scan point. Following step 816, the algorithm advances to step 817. In step 817, the computer drops each candidate next scan point that is outside a search range (i.e., the scan radius 401 of a sensor) as determined by the parameter CircularSearch-Bound. Following step 817, the algorithm advances to step 818. In step 818, the computer drops each candidate next scan point that is outside the sliding window determined by the parameter BackwardSearchBound. Following step 818, the algorithm advances to step 819. In step 819, the computer defines candidate scans to be all combinations of candidate scan points and allowed scan directions. Following step 819, the algorithm advances to step 820. In step 820, the computer determines whether every candidate scan has a cost. If every candidate scan has a cost, the computer advances the algorithm to step 825. If a candidate scan has no cost, the computer advances the algorithm to step 821. In step 821, the computer picks a candidate scan. Following step 821, the algorithm advances to step 822. In step 822, for the candidate scan selected, the computer determines whether the number of cells scanned is enough (greater than or equal to a predetermined amount) to conduct a cost analysis for moving the entity 200 to that scan point. If the number of scanned cells is large enough, the algorithm advances to step 823. In step 823, the computer conducts a cost analysis, as described above. If the number of scanned cells is not large enough, the algorithm advances to step 824. In step 824, the computer sets the cost of the scan at infinity. Following step 824, the algorithm retreats back to step 820. Following step 823, the algorithm retreats back to step 820.

In step 825, if no candidate scans remain or the cost for all candidate scans is infinity for an entity, the algorithm advances to step 828 and ends the algorithm. If candidate scans remain without infinite cost, the algorithm advances to step 826. In step 826, the computer selects the minimum cost candidate scan as the next scan, updates the time when that scan will take place, marks all cells visible from that scan as to be scanned. Following step 826, the algorithm retreats back to step 814. In step 827, the computer selects the entity with the earliest next scan, executes its next scan from the appropriate cell, sets that cell as the starting cell 501, and restarts the algorithm by advancing to step 814.

In accordance with another aspect of the present invention, a computer program product may utilize the above described algorithm for determining a route for each of a plurality of entities 200 through a predetermined area and for analyzing the content of the predetermined area. The product may include five procedures. These procedures may be integrated in a single computer or performed by separate, linked computers. The first procedure partitions the predetermined area into cells. The second procedure groups the cells into corridors. The third procedure determines a starting cell for each entity. The starting cells are each located in a cell in a corresponding corridor. The fourth procedure initiates a scan from each starting cell and determines the content of cells scanned by the fourth procedure. The fifth procedure determines a travel cost for each entity to travel to each of the scanned cells in that corresponding corridor and for each entity to perform a scan from each of the cells scanned in that corresponding corridor.

Another procedure may determine a next scan cell with a minimum total cost for each entity. Still another procedure may initiate a signal to move each entity to each next scan cell. Yet another procedure may redesignate each next scan cell as a starting cell for each entity and return the algorithm to the fourth procedure.

In accordance with still another aspect of the present invention, a computer program product may utilize the above described algorithm for routing a plurality of entities 200 through a predetermined area and for scanning the content of the predetermined area thereby analyzing the content of the predetermined area. The computer program product may include a computer readable medium located on one of a plurality of the entities 200 and a computer program stored by the computer readable medium. The computer readable medium may be part of a computer or microcomputer such as a personal computer or a programmable microcontroller.

The computer program may include the following instructions: a first instruction for partitioning the predetermined area into cells and grouping the cells into corridors; a second instruction for determining a starting cell for each of the plurality of entities 200 each in a corresponding corridor; a third instruction for initiating a scan, from each starting cell, of a number of the cells in the corresponding corridor and determining the content of each of the number of cells; a fourth instruction for determining a total cost for each entity to travel to each of the scanned cells and to perform a scan from each of the scanned cells; and a fifth instruction for determining a next scan with a minimum total cost for each entity.

Although the invention has been described in conjunction with the preferred embodiments, it is to be appreciated that various modifications may be made without departing from the spirit and scope of the invention as defined by the appended claims.

Having described the invention, we claim:

1. A computer-implemented method for routing a predetermined number of entities through a predetermined area for scanning the content of the predetermined area, said method comprising the steps of:

partitioning the predetermined area into a first set of cells;

grouping the first set of cells into a number of corridors, the number of corridors being equal to the predetermined number of entities;

the computer determines a starting cell for each entity in a corresponding corridor;

initiating a scan of a number of cells from the starting cell of a portion of each of the corridors from the starting cell of each of the entities and determining the content of each of the number of cells; and the computer determines a total cost for each entity to travel to each of the cells scanned by each entity and performing a scan from each of the cells scanned by each entity.

2. The computer-implemented method as set forth in claim 1 wherein said cost determining step comprises:

determining a travel cost for each entity to travel to each of the cells scanned by each associated entity;

determining a scan cost for each entity to perform a scan from each of the scanned cells in each corresponding corridor; and adding the travel cost and scan cost to compute the total cost.

3. The computer-implemented method as set forth in claim 1 further including the step of determining a next scan with a minimum total cost for each entity.

4. The computer-implemented method as set forth in claim 3 further including a step determining movement of one of the entities to one of the next scan cells.

5. The computer-implemented method as set forth in claim 3 further including the step of redesignating the next scan cells as a starting cell for an entity.

6. The computer-implemented method as set forth in claim 1 further including the step of starting said method over again.

7. The computer-implemented method as set forth in claim 2 further comprising the step of algebraically transforming the cost of traveling to a next scan cell.

8. The computer-implemented method as set forth in claim 2 further comprising the step of algebraically transforming a scan cost at each scan.

9. The computer-implemented method as set forth in claim 1 further comprising the step of subtracting a benefit amount from the total cost.

10. A computer program product for determining a route for each of a plurality of entities through a predetermined area and for analyzing the content of the predetermined area, said product comprising:

a first procedure that partitions the predetermined area into cells;

a second procedure that groups the cells into corridors;

a third procedure that determines a starting cell for each entity, each starting cell being located in a corresponding corridor;

a fourth procedure that initiates a scan of a number of the cells from each starting cell and determines the content of each of the number of cells; and a fifth procedure that determines a total cost for each entity to travel to each of the cells scanned in that corresponding corridor and for each entity to perform a scan from each of the cells scanned in that corresponding corridor.

11. The computer program product as set forth in claim 10 further including a sixth procedure that selects a next scan cell with the minimum total cost.

12. The computer program product as set forth in claim 10 further including a sixth procedure for determining movement of that entity to a next scan cell.

13. The computer program product as set forth in claim 10 further including a sixth procedure that redesignates a next scan cell for each entity as a starting cell for that entity.

14. The computer program product as set forth in claim 10 further including a sixth procedure that returns to the fourth procedure.

15. The computer program product as set forth in claim 10 wherein said fifth procedure further includes algebraically transforming the total cost.

16. The computer program product as set forth in claim 15 wherein said fifth procedure further includes subtracting a benefit amount from the total cost in each corridor.

* * * * *